119,242

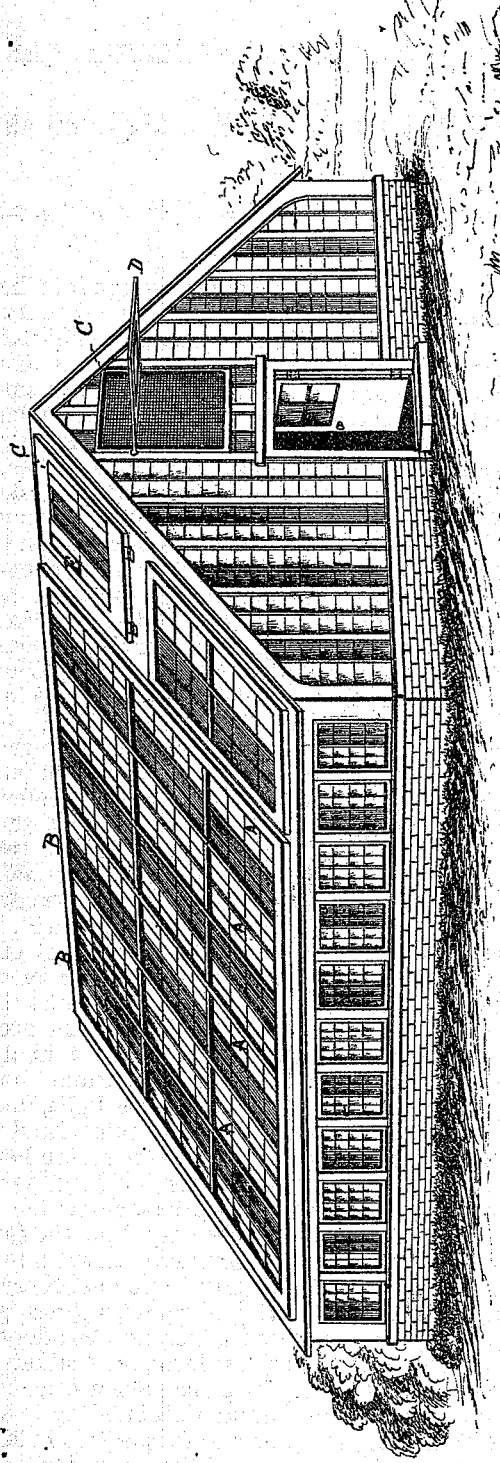

UNITED STATES PATENT OFFICE.

AUGUSTUS I. PLEASONTON, OF PHILADELPHIA, PENNSYLVANIA.

IMPROVEMENT IN ACCELERATING THE GROWTH OF PLANTS AND ANIMALS.

Specification forming part of Letters Patent No. 119,242, dated September 26, 1871.

*To all whom it may concern:*

Be it known that I, AUGUSTUS I. PLEASONTON, of the city of Philadelphia, in the State of Pennsylvania, have discovered a new and valuable aid and improvement in accelerating the growth to maturity of plants, vines, vegetables, cereals, and the flora of the vegetable kingdom of nature, and of animals, fowls, fishes, and birds of the animal kingdom of nature; and that I do hereby declare the following to be a full, clear, and exact description of the operation of the same by means of combining the natural light of the sun transmitted through transparent glass with the natural light of the sun transmitted through blue glass or any of the varieties of blue, as indigo or violet, in varied proportions of blue and white glass, from one of blue to eight of white, up to equal proportions of blue and white, as greater or less caloric is needed, according to the nature of the plants or animals, to accelerate their natural growth, increase their vitality, and hasten maturity; reference being also made to the accompanying drawing making a part of this specification, in which the figure represents one form of construction of a conservatory or grapery, in which—

A A A represent the clear or transparent glass, and B the blue or colored glass. Proper ventilation is effected by means of wire-cloth placed in the walls, as shown at C, and which can be opened and closed at pleasure by means of hinged glazed sashes, as shown at D. There is also represented at E a hinged sash, glazed with both clear and blue glass, for changing the angle of incidence to agree with the declination of the sun. These proportions of the natural light of the sun with the blue or electric transmitted rays may be varied to conform to the specific constitution of the varieties of life in the vegetable world and the varieties of constitution in the animal world, and can only be ascertained throughout both kingdoms by progressive and continued experiment. The proportions of the heating rays and the transmitted blue electric rays must be varied to conform to the constitutional vitality of the vegetable or animal, and care must be had that the heating or caloric light is not in excess of the electric or vitalizing and growing transmitted blue light.

I confine myself to no particular form, externally or internally, of the buildings to be used, whether they apply to the growth and propagation of plants, vegetables, fruits, &c., or to the growth, propagation, &c., of animals, fishes, and fowls; but the best form is that building which will receive the rays of the sun during its daily revolution as nearly perpendicular as practicable to the surfaces of the glass covering, so that the rays shall be as little deflected as possible, and the tiers or rows of blue glass, violet or other degrees of blue, shall be continuous over the entire portion of the building on which the sun shines, imparting in this way to every portion of the interior uniformly throughout the day the caloric and electric rays in the proportions of the white and blue glass in their alternations. Such structures should be built on curves, conforming to the curve in which the sun moves in its daily revolution, and the alternating rows of white and blue glass should extend over the portions on which the sun shines, so that in the course of the day plants and vegetables, wherever they grow under the glass, will all have the same exposure to the caloric and electric transmitted light. Variations from these forms of buildings, and variations in the proportion of the natural caloric and blue electric light will, in degree, accelerate the growth and maturity of plants and animals, depending upon their constitution and vitality; and the same proportions that hasten growth in the vegetable kingdom are not the best for many animals of the animal kingdom. Experience alone can determine the best proportions of natural and blue light, depending on the constitution of the animal and the nature of the plants. In extreme northern latitudes the form given to the glass buildings so as to take the sun's rays perpendicularly to the surfaces during the day would vary from the form that should be given in southern latitudes to effect the same purpose. Therefore no one general plan for the construction of conservatories, graperies, houses for animals, &c., can be adopted or described beyond the rule for the builders to conform the shape of the glass portions so as to present their surfaces around his building in form to take the sun's rays as nearly perpendicularly as practicable, so as to avoid their deflection. All persons skilled in building will readily understand this principle, and be enabled to make use of the discovery and apply it to practical use, in whatever place he may live, extreme north or extreme south, within the limits of the sun's rising and setting. I prefer, as a transmitting medium for the electric rays of the sun, blue glass, violet and indigo; but I do not confine myself to the use of glass, as the sun's transmitted rays convey these colors through other mediums, producing in degree the same results.

In building for the treatment of invalids, whether they may be men or animals, no particular form or construction of hospital, house, or stable will be necessary, as the beds of invalid man and the places for animals can be so changed that the order of the means for transmitting the blue light may be very variable. The proportion of electric blue light and the natural light, however, should be constant, or as nearly so as practicable, after the proportions are ascertained by experience that prove most beneficial in their healing process.

I do not pretend to be the first discoverer of the vitalizing and life-growing qualities of the transmitted blue light of the solar rays, and its effect in quickening life and intensifying vitality.

I have found, upon patient and long experiments, running through many years, that plants, fruits of plants, vines, and fruits of vines and vegetables so housed and inclosed as to admit the natural light of the sun through ordinary glass, and the transmitted light of the solar rays through the glasses of blue, violet, or purple colors in the proportion of eight of natural light to one of the blue or electric light, grow much more rapidly, ripen much quicker, and produce much larger crops of fruit than the same plants housed and treated with the natural light of day, the soils and fertilizers and treatment and culture being identical in both cases and the exposure the same.

I have also found, by repeated and patient experiment of several years, that young animals, fishes, and fowls under the same care, food, regimen, and treatment grow much more rapidly and to a much larger size under the influence of the combined natural light of day with the transmitted blue electric light than when exposed only to the natural sunlight, and that their flesh is equally good, and their health, vigor, and constitutions are equal to those that, under the same circumstances of food, care, and shelter, grow in the natural light. In these experiments with animals, fishes, and fowls I have not used the same proportions of natural light and transmitted blue light, viz., eight of natural to one of blue light, that I used in my experiments with vines, vegetables, and fruits, but with the first-named the proportions of natural and blue light were equal; and I prefer not those proportions of the natural caloric light and the transmitted electric light; yet I do not doubt that other proportions, depending upon the different organic constitutions in both the animal and vegetable creations, may be found to combine life-growing and vitalizing powers even exceeding the results I have produced, and still more productive of good in creating greater results. In these experiments I have discovered and proved that the transmitted blue light of the solar rays in its different degrees of intensity of color, in combination with natural sunlight, imparts vigor and vitality to the vegetation and life-growing principle in nature, heretofore unknown and never before utilized and applied to practical results of incalculable value to stock growing, to agriculture, and horticulture, both as relates to time labor, and economy.

I have also discovered, by experiment and practice, special and specific efficacy in the use of this combination of the caloric rays of the sun and the electric blue light in stimulating the glands of the body, the nervous system generally, and the secretive organs of man and animals. It therefore becomes an important element in the treatment of diseases, especially such as have become chronic, or result from derangement of the secretive, perspiratory, or glandular functions, as it vitalizes and gives renewed activity and force to the vital currents that keep the health unimpaired, or restores them when disordered or deranged.

Having thus fully described my discovery and invention, what I claim, and desire to have secured to me by Letters Patent, is—

1. The method herein described for utilizing the natural light of the sun transmitted through clear glass, and the blue or electric solar rays transmitted through blue, purple, or violet-colored glass, or its equivalent, in the propagation and growth of plants and animals, substantially as herein set forth.

2. The herein-described construction of conservatories and other buildings, when the roof, walls, or parts thereof are covered with alternating portions of clear and blue, purple, or violet glass, or equivalents, as and for the purposes set forth.

In testimony that I claim the above I have hereunto subscribed my name in the presence of two witnesses at the city of Philadelphia the 23d day of June, A. D. 1871.

AUGUSTUS I. PLEASONTON.

Witnesses:
H. TUNISON,
H. A. NAGLE.